US009065977B2

(12) United States Patent
Candelore (10) Patent No.: US 9,065,977 B2
(45) Date of Patent: Jun. 23, 2015

(54) IDENTIFICATION OF A COMPROMISED CONTENT PLAYER

(75) Inventor: Brant L. Candelore, San Diego, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 517 days.

(21) Appl. No.: 13/593,899

(22) Filed: Aug. 24, 2012

(65) Prior Publication Data
US 2012/0324221 A1    Dec. 20, 2012

Related U.S. Application Data

(62) Division of application No. 11/895,199, filed on Aug. 23, 2007, now Pat. No. 8,290,157.

(60) Provisional application No. 60/902,541, filed on Feb. 20, 2007.

(51) Int. Cl.
  *G06F 21/00* (2013.01)
  *H04N 7/167* (2011.01)
  *H04L 9/08* (2006.01)
  *H04N 21/258* (2011.01)
  (Continued)

(52) U.S. Cl.
  CPC .............. *H04N 7/1675* (2013.01); *H04L 9/083* (2013.01); *H04L 2209/603* (2013.01); *H04N 21/2585* (2013.01); *H04N 21/26613* (2013.01); *H04N 21/63345* (2013.01)

(58) Field of Classification Search
  CPC .......................... H04L 9/083; H04L 2209/603
  USPC ............................................. 713/189; 726/26
  See application file for complete search history.

(56) References Cited

U.S. PATENT DOCUMENTS 6,490,353 B1 * 12/2002 Tan ................................. 380/37
6,665,303 B1 * 12/2003 Saito et al. .................... 370/401
(Continued)

FOREIGN PATENT DOCUMENTS

WO    WO 2005/008385    1/2005

OTHER PUBLICATIONS

Perkins et al, k-time encryption for k-time licensing, 2002, IEEE, vol. 1, pp. 601-604 vol. 1.*

(Continued)

*Primary Examiner* — Bradley Holder
*Assistant Examiner* — Ali Shayanfar
(74) *Attorney, Agent, or Firm* — Miller Patent Services; Jerry A. Miller (57) ABSTRACT

A system and method for identifying the player that leaked content encryption keys by loading a set of player keys into individual content players and determining the number of encryptions and the number of encryption keys to use in multiple encrypting critical content. The method produces copies of critical data content packets, each copy of which is separately encrypted using any one of a set of encryption keys that are related to one another through a mathematical algorithm. The related set of encryption keys and data describing key relationship and content player identity are transmitted to a previously determined license management agency. The transmitted encrypted content is written to a receiving device or file, or streamed to an individual player for non-synchronous playback. This abstract is not to be considered limiting, since other embodiments may deviate from the features described in this abstract.

19 Claims, 7 Drawing Sheets

(51) Int. Cl.
*H04N 21/266* (2011.01)
*H04N 21/6334* (2011.01)

(56) References Cited

U.S. PATENT DOCUMENTS

| | | | |
|---|---|---|---|
| 7,233,948 B1 | 6/2007 | Shamoon et al. | |
| 7,636,843 B1 * | 12/2009 | Asano et al. | 713/169 |
| 2002/0052885 A1 * | 5/2002 | Levy | 707/200 |
| 2002/0076204 A1 | 6/2002 | Nakano et al. | |
| 2002/0133701 A1 | 9/2002 | Lotspiech et al. | |
| 2002/0136411 A1 | 9/2002 | Ishiguro et al. | |
| 2002/0150239 A1 | 10/2002 | Carny et al. | |
| 2002/0154779 A1 | 10/2002 | Asano et al. | |
| 2002/0199099 A1 | 12/2002 | Shirai et al. | |
| 2003/0081786 A1 | 5/2003 | Nakano et al. | |
| 2003/0159139 A1 | 8/2003 | Candelore et al. | |
| 2004/0049688 A1 | 3/2004 | Candelore et al. | |
| 2004/0107356 A1 | 6/2004 | Shamoon et al. | |
| 2004/0111611 A1 | 6/2004 | Jin et al. | |
| 2004/0133794 A1 | 7/2004 | Kocher et al. | |
| 2004/0184616 A1 | 9/2004 | Morten | |
| 2004/0190868 A1 | 9/2004 | Nakano et al. | |
| 2005/0015343 A1 | 1/2005 | Nagai et al. | |
| 2005/0038997 A1 | 2/2005 | Kojima et al. | |
| 2005/0138654 A1 | 6/2005 | Minne | |
| 2005/0185923 A1 | 8/2005 | Tsurui et al. | |
| 2005/0195975 A1 * | 9/2005 | Kawakita | 380/30 |
| 2005/0213941 A1 | 9/2005 | Taira et al. | |
| 2005/0271211 A1 | 12/2005 | Takemura | |
| 2006/0002565 A1 | 1/2006 | Takemura | |
| 2006/0067529 A1 | 3/2006 | Kojima | |
| 2007/0033419 A1 | 2/2007 | Kocher et al. | |
| 2007/0067242 A1 | 3/2007 | Lotspiech et al. | |
| 2007/0067244 A1 | 3/2007 | Jin et al. | |
| 2007/0198413 A1 * | 8/2007 | Nagao | 705/50 |
| 2008/0008458 A1 | 1/2008 | Gudipaty et al. | |
| 2008/0063209 A1 | 3/2008 | Jaquette et al. | |
| 2008/0152146 A1 * | 6/2008 | Conrado et al. | 380/278 |
| 2008/0210747 A1 * | 9/2008 | Takashima | 235/375 |

OTHER PUBLICATIONS

Taojun et al, Digital Rights Management for Video Sensor Network, 2006, IEEE, pp. 131-138.*

Jin et al., "Renewable Traitor Tracing: A Broadcast, Tracing and Revoke System for Anonymous Attack," IBM Research Report, Nov. 1, 2006.

Basu, Sourish, "Digital Rights, Deja Vu Disks," Scientific American, Sep. 2007.

International Search Report and Written Opinion of the International Searching Authority, PCT/US08/01532, Aug. 1, 2008.

* cited by examiner

| Device Key A | Device Key B | Device Key C | Device Key D | Device Key E |
|---|---|---|---|---|
| Device Key A Byte 0, Nibble0 = 0 ← Key Variant 1 | | | | |
| Device Key A Byte 0, Nibble0 = 1 ← Key Variant 2 | | | | |
| Device Key A Byte 0, Nibble0 = 2 ← Key Variant 3 | | | | |
| Device Key A Byte 0, Nibble0 = 3 ← Key Variant 4 | | | | |
| Device Key A Byte 0, Nibble0 = 4 ← Key Variant 5 | | | | |
| Device Key A Byte 0, Nibble0 = 5 ← Key Variant 6 | | | | |
| Device Key A Byte 0, Nibble0 = 6 ← Key Variant 7 | | | | |
| Device Key A Byte 0, Nibble0 = 7 ← Key Variant 8 | | | | |
| Device Key A Byte 0, Nibble0 = 8 ← Key Variant 9 | | | | |
| Device Key A Byte 0, Nibble 0 = 9 ← Key Variant 10 | | | | |
| Device Key A Byte 0, Nibble 0 = a ← Key Variant 11 | | | | |
| Device Key A Byte 0, Nibble0 = b ← Key Variant 12 | | | | |
| Device Key A Byte 0, Nibble 0 = c ← Key Variant 13 | | | | |
| Device Key A Byte 0, Nibble 0 = d ← Key Variant 14 | | | | |
| Device Key A Byte 0, Nibble 0 = e ← Key Variant 15 | | | | |
| Device Key A Byte 0, Nibble 0 = f ← Key Variant 16 | | | | |

IDENTIFICATION OF A COMPROMISED CONTENT PLAYER

CROSS REFERENCE TO RELATED DOCUMENTS

This application is a divisional application of allowed U.S. patent application Ser. No. 11/895,199 filed Aug. 23, 2008, which is related to and claims priority benefit of U.S. Provisional Patent Application 60/902,541 filed Feb. 20, 2007 both of which are hereby incorporated herein by reference.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

The Advanced Access Content System (AACS) is a specification developed and managed under the direction of the Advanced Access Content System Licensing Administrator (AACS LA) that provides a secure means to distribute movie content to users in the marketplace. Content encoded with the AACS is encrypted such that a "Title Key" is used to decrypt the content within a player. The term "Title Key" and other terms used herein are to be construed to be used in a manner consistent with that of the AACS specifications. Refer to the AACS Introduction and Common Cryptography Elements specification for details regarding key management. The Title Key is encrypted using a tree-based Media Key Block (MKB). The MKB is based on player unique, AACS LA assigned, Device Keys, and the use of Broadcast Encryption whereby non-compliant players can be revoked, e.g. excluded from receiving the Title Key for new titles. Non-revoked players can calculate one of the Media Keys in the AACS MKB, and therefore decrypt the Title Key.

A Title Key must, by its very nature, remain confidential. There is no traceability inherent in a Title Key that is disseminated and used to encrypt thousands or even hundreds of thousands of copies of a Title. If a Title Key is compromised and posted on the Internet, a hacker can use it to ignore AACS compliance rules with a non-licensed and non-compliant player. The player can rip the encrypted content from the package media or stream, copy it, optionally down-res and re-encode it, and then distributed it for free over the Internet. Exposure of the Title Key can destroy the ability of the artists and creators of the content to profit from their labor. Needless to say, content security would be more robust if the Title Key remained secret!

It would be useful to forensically know what playback device leaked a Title Key that was made public in order to revoke it. By way of example, one method, which the AACS has provided as an option, implements such a mechanism for identifying a compromised player called Sequence Keys and the Sequence Key Block (SKB). Sets of Sequence Keys are assigned to individual players by the AACS LA. AACS copies multiple segments of content. AACS then encrypts the multiple segments of content using keys derived from the Sequence Keys, the Sequence Key Block (SKB) and the Title Key to effectively create sets of what we will call "sub-Title Keys" that will decrypt the common non-multiple encrypted segments as well as the multiple encrypted segments of content. The exact method in which sub-Title Keys are generated from the Sequence Keys, the SKB and the Title Key is not discussed here. Please reference the Advanced Access Content System: Pre-recorded Video Book specification.

With AACS Sequence Keys and the SKB, there is no longer a single key which will decrypt all the content. The process effectively splinters the single Title Key into many sets of what we will call "sub-Title Keys". Certain content segments are replicated and a sub-Title Key is applied to each copy of the segment. Since each player derives a unique set of sub-Title Keys that will allow it to decrypt common and encrypted content segments, if they are made public, they could be forensically analyzed to identify the player from which they leaked.

The Sequence Keys and SLB method for identifying a compromised player suffers from some shortcomings. When implementing sub-Title Keys as provided by the AACS specification, segments of content must be copied. A segment may be composed of entire scenes of content which must be 100% copied for as many sub-Title Keys as are to be used for that segment. Depending on the AACS Sequence Keys and SLB key management, hundreds and, possibly, a thousand, sub-Title Keys may be required to encrypt all identified content segments. Content segments to be encrypted can be as much as about 10 seconds in duration. Segments must be of a long enough duration that if the key were missing, and the segment could not be decrypted, then the content would be significantly degraded. In other words, with missing content, the enjoyment that hackers would receive from watching the content would be affected.

In one exemplary embodiment, assuming 500 encrypted content segments (using sub-Title Keys), then 500 encryption actions×10 seconds/encryption=5,000 seconds or 83 minutes or 1.39 hours of extra content that needs to be streamed or delivered on the package media when implementing the security protection provided by Sequence Keys. This is a huge amount of extra data that must be processed for essentially the same content. It provides no extra benefit to the consumer, such as extra content that details how the movie was made or interviews with the director and actors. It dramatically increases the file size as well as the bandwidth required to stream content. Because of the large amount of additional content that must be added when implementing the Sequence Key security provision within AACS, few providers of content have been inclined to use Sequence Keys.

Additionally, each 10 second branch must be identified and pre-signaled in order for a player to properly select one of the plurality of encrypted segments that could be decrypt. A particular sub-Title Key that was derived from a player's Sequence Keys and SKB can only decrypt a particular segment. That segment must be navigated. The extra content is so voluminous due to the requirement for 100% encryption of the segments that special navigation is required similar to that used for alternate scenes or alternate endings, except that in this case, it is for alternate encryption (with the content being the same). This adds complexity to the navigation of a player.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Software and/or firmware embodiments may be implemented using one or more programmed processors executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies) and/or can be transmitted over any suitable electronic communication medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

Content may be embodied as any or all audio, video, multimedia or interactive data that may be encoded with entertainment, training, artistic, textual, or experimental subject matter that is created for playback in modes such as compact disc (CD), digital versatile disc (DVD), high definition DVD (HD-DVD), Blu-ray Disc (BD) of any suitable format, tape, Internet streams or downloads, handheld players, computer storage media or any other suitable playable modes.

In order to address the problems noted above, it would be useful to have an efficient way to multiple encrypt content and apply a plurality of sub-Title Keys to the content. It would also be of interest to have a more efficient way to navigate the appropriate encrypted content segments.

In addition, an alternative method to sub-Title Key generation is discussed which segments the player population according to nibble or byte values of a secret, identifying number that maintains the forensic determination of the original player from a disseminated sub-Title key.

Figure 1:
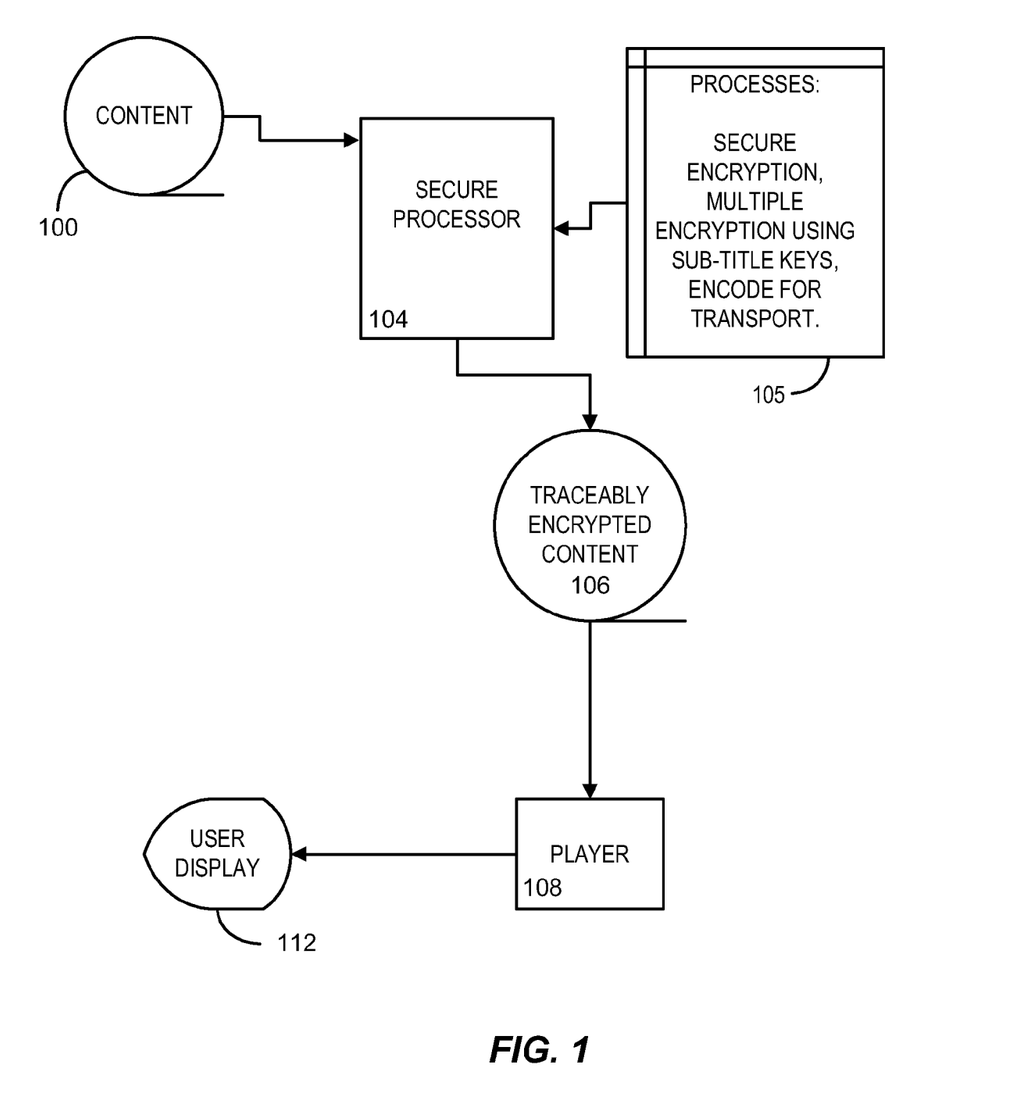
FIG. 1 is a diagram of an exemplary secure encryption system consistent with certain embodiments of the present invention.

Turning now to FIG. 1, consistent with certain embodiments of the invention this figure presents an exemplary view of one possible system configuration. In this exemplary configuration, content 100 that is to be encrypted to provide security against unauthorized downloading or copying is transmitted to a secure processor 104. Once the content has been received by the secure processor 104, a suite of software modules 116 are instantiated to perform the actions used to determine how the content 100 is to be encrypted, the number and type of encryption keys are selected, the content 100 is encrypted, the encryption keys used are traceably related to one another, and the traceably encrypted content 106 is encoded for transport and transmitted to a designated player 108. "Transmitted" in this context can mean recorded to package media with the ultimate playback by a customer in a home. The players 108 that are the destination for the traceably encrypted content 106 have been previously loaded with the set of encryption keys for that particular player 108. If the players 108 have a valid set of decryption keys, the traceably encrypted content 106 is decrypted and displayed on the User Display 112 as it is received or, alternatively, as it is read from a storage device such as a hard disk drive, CD, DVD, HD-DVD or Blu-ray Disc. While depicted and described herein as actions carried out in software modules, the processes carried out in secure processor 104 can equivalently be carried out in hardware devices, specialized processors, general purpose processors, hard wired logic or some combination thereof.

Figure 2:
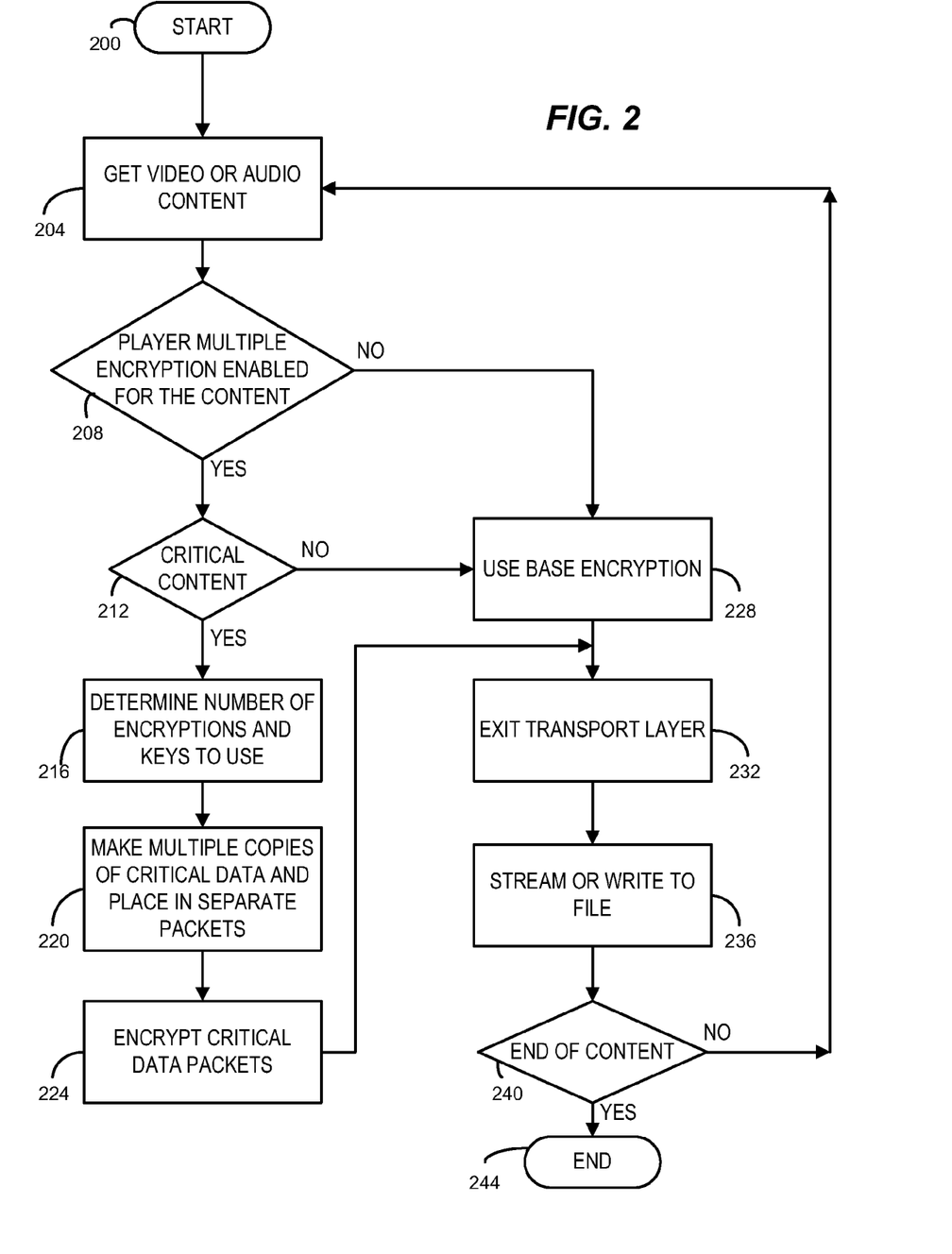
FIG. 2 is an illustrative process flow diagram of the secure encryption system consistent with certain embodiments of the present invention.

Turning now to FIG. 2, consistent with certain embodiments of the invention this figure presents an exemplary process flow for encryption activity within the secure processor 104. In an exemplary embodiment, content 100 to be encrypted is passed from an input queue storage element to the secure encryption process 204. The software module performs a check to determine if player multiple encryption has been enabled for the received content 208. If player multiple encryption has not been enabled for the received content 208, the software module encrypts the content with a standard encryption method and standard encryption key, which could be a common sub-Title Key to all players that is used as a base level of encryption 228 for all content in the Title not selected for multiple encryption. It should be pointed out that some content could be left in the clear. However, if it is non-critical and encryption is to be used, then base level encryption 228 can be used. Base level encryption prevents a hacker from attempting to recover the critical data from the non-critical content if left in-the-clear. However, it is possible that an operator may wish to leave some content in-the-clear for to un-burden software decryption of the content. In an exemplary embodiment, content that is selected for multiple encryption is to be prepared for the multiple encryption process by creating multiple copies of the content to be encrypted. In the exemplary embodiment, each copy of the content is then encrypted using different encryption means such as, for example, a different encryption key, e.g. sub_Title Key, for each copy of content.

If player multiple encryption has been enabled for the received content 208, the encryption software module receives the content and begins the process of multiply encrypting the received content by checking for critical content 212. "Critical content" is defined for the process as that content that must be encrypted differently than content using the base encryption. "Critical content", when encrypted, is designed to be content that the received content as a whole would not make sense when used and that minimizes the amount of content that must be encrypted differently than the base encryption. If not properly decrypted, it renders a portion of a video image difficult or impossible to view, or renders a portion of audio difficult or impossible to hear if not properly decrypted. The term "critical" should not be interpreted as an absolute term, in that it may be possible to hack an elementary stream to overcome encryption of a "critical content", but when subjected to normal decoding, the inability to fully or properly decode such a "critical content" would inhibit normal viewing or listening of the program content. The term "critical" as used herein, should therefore carry similar connotations in all instances and should not be interpreted as an absolute.

In certain embodiments consistent with the invention "critical" content may be defined as all of the I-frames of video content encoded in an MPEG format. In another embodiment of the invention critical content may be defined as just the headers of the I-frames of video content encoded in an MPEG format. The content is delivered using an MPEG Transport Stream. Other examples are depicted, for example, by U.S. Pat. No. 7,151,831 "Partial Encryption and PID Mapping" to Candelore et al. which is hereby incorporated by reference. U.S. Application No. 20050192904 "Selective Encryption with Coverage Encryption" to Candelore, which is hereby incorporated by reference, discusses the use of base encryption along with multiple encryption so that no content is left in-the-clear. U.S. Application No. 20040181666 "IP Delivery of Secure Digital Content" to Candelore, which is hereby incorporated by reference, discusses the use of multiple encryption with Internet Protocol (IP) packets.

The identified critical content, when encrypted, renders the received content unusable by players that do not have the proper Keys (as described below) to decrypt the critical content. Multiple encrypting of just the critical content as opposed to 100% of the content provides huge storage and bandwidth advantages in comparison to multiple encrypting entire scenes of content. Much less content needs to be duplicated to achieve same goal. For example, if only the headers of I-frames (2 out of 30 frames of a 4 Mbit/second Transport Stream or file) were encrypted then this would represent less than approximately 0.5% of standard definition MPEG2 content. Multiple encrypting that content 16 times for an exemplary embodiment of the invention would only be an 8% instantaneous increase to overall file size or stream bandwidth. This allows copied packets to be interspersed with packets from content which are not copied. In comparison, with the existing AACS method using Sequence Keys and SKB as described above, there would be 1600% instantaneous increase. It is noted, however, that many variations are possible without departing from embodiments consistent with the present invention in light of the present teachings.

The copied content is treated as a separate stream. In the exemplary embodiment using critical packet technology, assuming 500 overall encryptions for the entire title, then 500 encryptions×10 seconds/encryption×0.5%=25 seconds of extra content is streamed or delivered on the package media. It should be noted that while multiple encryption does not need to occur for the entire program, there may be a large number of sub-Title Keys to "test", as many as 500 in the above example. Regardless of the definition of the critical data, performing a multiple encryption process on the critical data may produce a minimal addition to processing time overhead for performance of the multiple encryption process. Thus, the additional processing time for multiple encryption actions for the defined critical data is a minimal addition to processing overhead, while still providing for security against unauthorized use of the content as a whole. For content that is not designated as critical content by the definition previously recited, the content is encrypted using the base encryption 228.

Referring to U.S. Pat. No. 7,151,831, the content can be delivered in MPEG transport streams with packets containing a Packet Identifier (PID) field. Content delivered using base encryption can have packets marked by a particular PID while content packets delivered using various sub-Title Keys can be delivered using differently marked packets. The decoder ICs of the players can be programmed to swap packets on-the-fly. Consequently "navigation" using the critical packet method for doing multiple copies and encryption can be as simple as programming the decoder IC with "insertion mode". If a packet is received that is encrypted by a sub-Title Key that the player should respond to marked by a secondary PID and encrypted using a sub-Title Key, the decoder IC can put that packet in-line with the rest of the content that was encrypted with base encryption such as a common sub-Title Key. Referring to U.S. Application No. 20040181666, the content can be delivered in IP packets. Private data can be used to identify where multiple encrypted segments are located whether in the same IP packet or located in a separate IP packet. An IP processor in the player can select the appropriate content and put it in-line for decoding. Navigation is thus very simple because the various encrypted packets can be in-line with the rest of the content. MPEG timing can be preserved within a single stream. Since the AACS method as described above requires a 100% duplication for each sub-Title Key, it must branch to a different part of the package media or file.

Once critical content has been identified, the encryption process determines the availability of encryption "slots"—in the case of critical packet selection, the number of critical packets for the available packets that constitute a file or stream and amount of available packets that can be used. From this analysis, the number of encryptions can be calculated—these are the number of keys to use for the encryption of the data 216, e.g. for the next 10 seconds. After 10 seconds, a different set of sub-Title Keys may be used for the next 10 seconds, and so on. All non-revoked players will be able to select a sub-Title Key which will work to decrypt content. The players will not select the same sub-Title Key for all content and consequently if a file of sub-Title Keys for a Title is made known, e.g. published on the Internet, it will be unique for a player. The specific set of sub-Title Keys may then be used to identify the original player from which they were hacked by identifying the unique Sequence Keys used to generate the sub-Title Keys.

It should be noted that while the sets of sub-Title keys are unique, they could be used by a group or class of player and not just a single player. In this case, tracing or exposure of the sub-Title Keys would expose the group or class. Revocation of the group or class could be tricky since it might render all the associated players inoperative for new content. However, exposing the group or class of player might be acceptable for software players, e.g. application executing on a PC platform, connected to a back channel, e.g. the Internet, where new software and possibly keys could be downloaded. In that scenario, software players would not be able to decrypt content until a new updated version of the player was downloaded.

Figure 3:
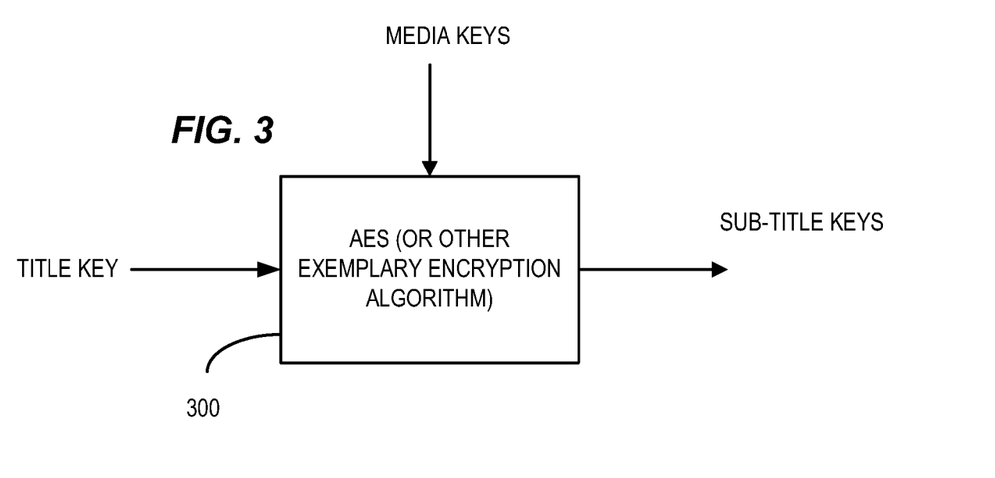
FIG. 3 is an illustrative example of the formation of Sub-Title keys consistent with certain embodiments of the present invention.

Turning to FIG. 3, in certain embodiments of the invention a Title Key is provided by a licensed Replicator or Stream Generator to provide for encryption of actual content for any given Title to be disseminated in any form. In certain embodiments the same license authority, or a different license authority, as an alternative to AACS Sequence Keys, prepares a set of Key Variants for use in multiple encryption. The Key Variants can be a derivative key formed using the shared device keys. If nibbles are used, then there are 16 Key Variants. The Key Variants are stored within a database table, which is included in the security information for disseminated content. Each entry within the distributed Key Variant table is referenced by a pointer. These pointers are formed by splitting the distributed Device Key into nibble (4 bit) portions and assigned each nibble as a pointer Key Variants within the Key Variant table. In a consistent embodiment of the invention, the Title Key is fractured into as many as 32 Sub-Title Keys at 300 by using each Key Variant as the key and the Title Key as the data using an exemplary encryption means such as the Advanced Encryption Standard (AES) algorithm, resulting in up to 32 Sub-Title Keys which may be used in multiple encryption of critical content.

Turning back to FIG. 2, in certain embodiments consistent with the invention the security of the Title Key is maintained by fracturing the Title Key into a plurality of Sub-Title Keys as described above, each of which may then be used to encrypt multiple copies of critical content if multiple encryption has been enabled. Each iteration of the process produces one of the set of Sub-Title Keys that will then be used to multiple encrypt the prior identified critical content 212. Traceability for each Sub-Title Key is maintained by the assignment of each Key Variant to one nibble of a previously assigned unique Device Key. In this fashion, if a set of Sub-Title Keys, which has been generated from a Legacy Title Key, appear in a public spot, such as a web site, that set of Sub-Title Keys may be traced back to an originating player through the trail of the associated nibble of the unique Device Key and Key Variant that were used to create the set of Sub-Title Keys. This provides a traceability path for discovery of the origin of the set of Sub-Title Key and the unique Device Key used in its preparation.

For certain embodiments of the invention, with the completion of the determination of the number of encryptions to be used when multiple encryption has been enabled and creation of the Sub-Title Keys 216, the system then creates multiple copies of the critical data content and places these copies in separate packets 220. Packets of data are then encrypted within the transport layer with critical data packets being encrypted using the previously generated Sub-Title Keys 224. The system exits the Transport layer 232 and streams together all of the encrypted data content, both content encrypted using base level encryption and critical content that has been encrypted using one or more of the Sub-Title Keys, and may then either write the entire encrypted data content to a file or stream the encrypted data content to a player across a network communications channel 236.

The system then checks for additional content requiring encryption 240. If this is the last set of data to be encrypted for this period of operation, the system ceases operation 244. If there are additional content to be encrypted, the system begins operation once again by retrieving the next content 204.

Figure 4:
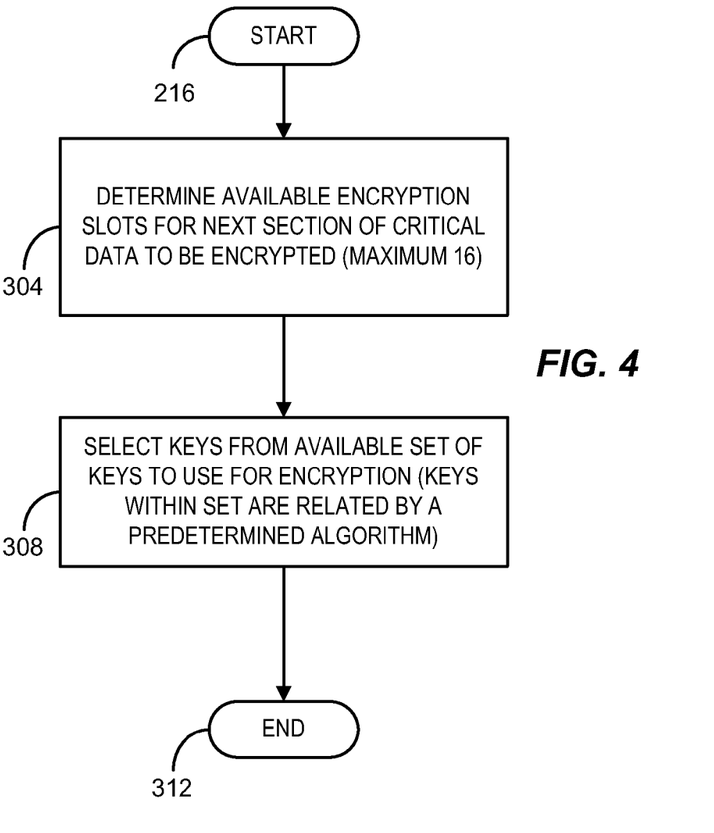
FIG. 4 is a diagram for depicting an illustrative process for determining a number of encryptions and keys in use by the system consistent with certain embodiments of the present invention.

Turning now to FIG. 4, as an alternative to the Sequence Key and SKB method for generating sub-Title Keys used in AACS, for certain embodiments consistent with the invention determining the number of encryptions and keys to use 216 is determined by which encryption slots are available for the encryption of the next portion of critical data content 304. In certain embodiments of the invention, and as described above, the unique Device Key may be segmented into nibbles (4 bit sections). Each nibble may express a pointer to as many as 16 byte and nibble unique Key Variants (values 0-F). Thus, in an exemplary embodiment, critical data packets may be encrypted by any one of up to 16 sub-Title Keys which are created by the selected Key Variant as referenced by the selected pointer associated with a given nibble within an assigned Device Key. In a further embodiment, the segmentation of a Device Key may be along byte (8 bits) or double byte (16 bits) boundaries, thus providing many more pointers (up to 256 for byte boundary or up to 65,536 for double byte boundaries) to Key Variants and many more encryption possibilities. With the available key set thus determined, the system selects those keys to be used in encrypting critical content packets 308.

Figure 5:
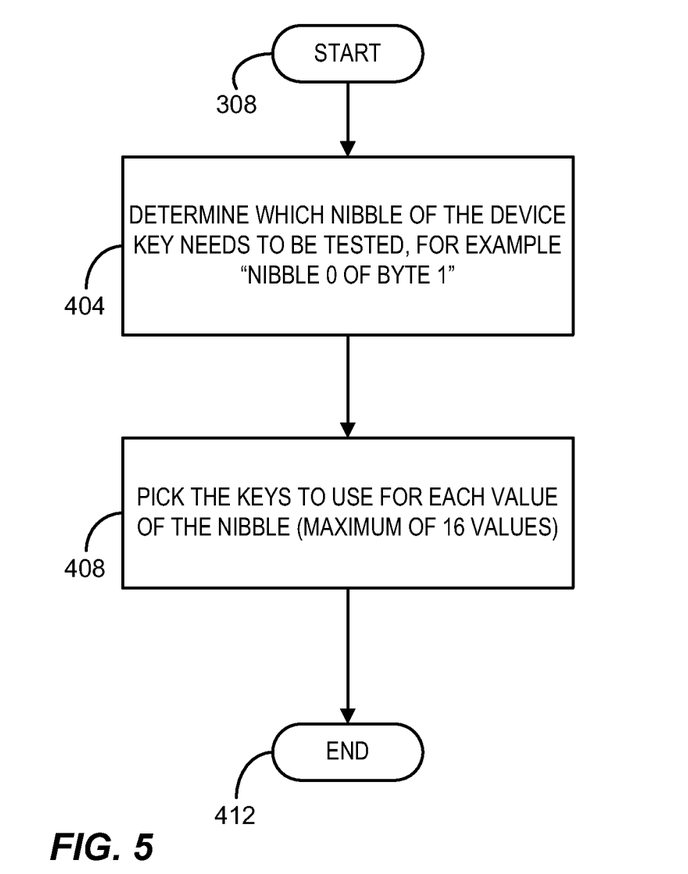
FIG. 5 is a diagram of an illustrative process for key selection activity consistent with certain embodiments of the present invention.

Turning now to FIG. 5, for certain embodiments of the invention the system determines, based upon the group of players that is to receive the encrypted content from a given encryption action, which nibble of the Device Key will be used as the table of pointers to the Key Variants to be used in this iteration of content packet encryption 404. The licensed Replicator or stream Generator is responsible for recording what content Key Variants have been assigned to each nibble. This information is maintained and communicated to a license authority for future determination of origin, should any set of sub-Title Keys become public knowledge. In the exemplary embodiment, once the nibble value of the Device Key has been determined, a set of Key Variants is generated using the AES encryption algorithm (or other suitable encryption algorithm) and each value (1-16) of the Device Key nibble is assigned as a pointer to one of the set of Key Variants 408. The Key Variants are thus maintained in a table of up to 16 values, for each nibble of the Device Key, each value of which is referenced by a pointer referenced by the selected nibble of the Device Key. In certain other embodiments, the Device Key boundary may be set as a byte or double-byte, to generate more Key Variant pointers for a single segment of the Device Key. For a byte boundary the table would have up to 256 Key Variant reference pointers, and for a double-byte boundary the table would have up to 65,536 Key Variant reference pointers, for one exemplary embodiment.

Figure 6:
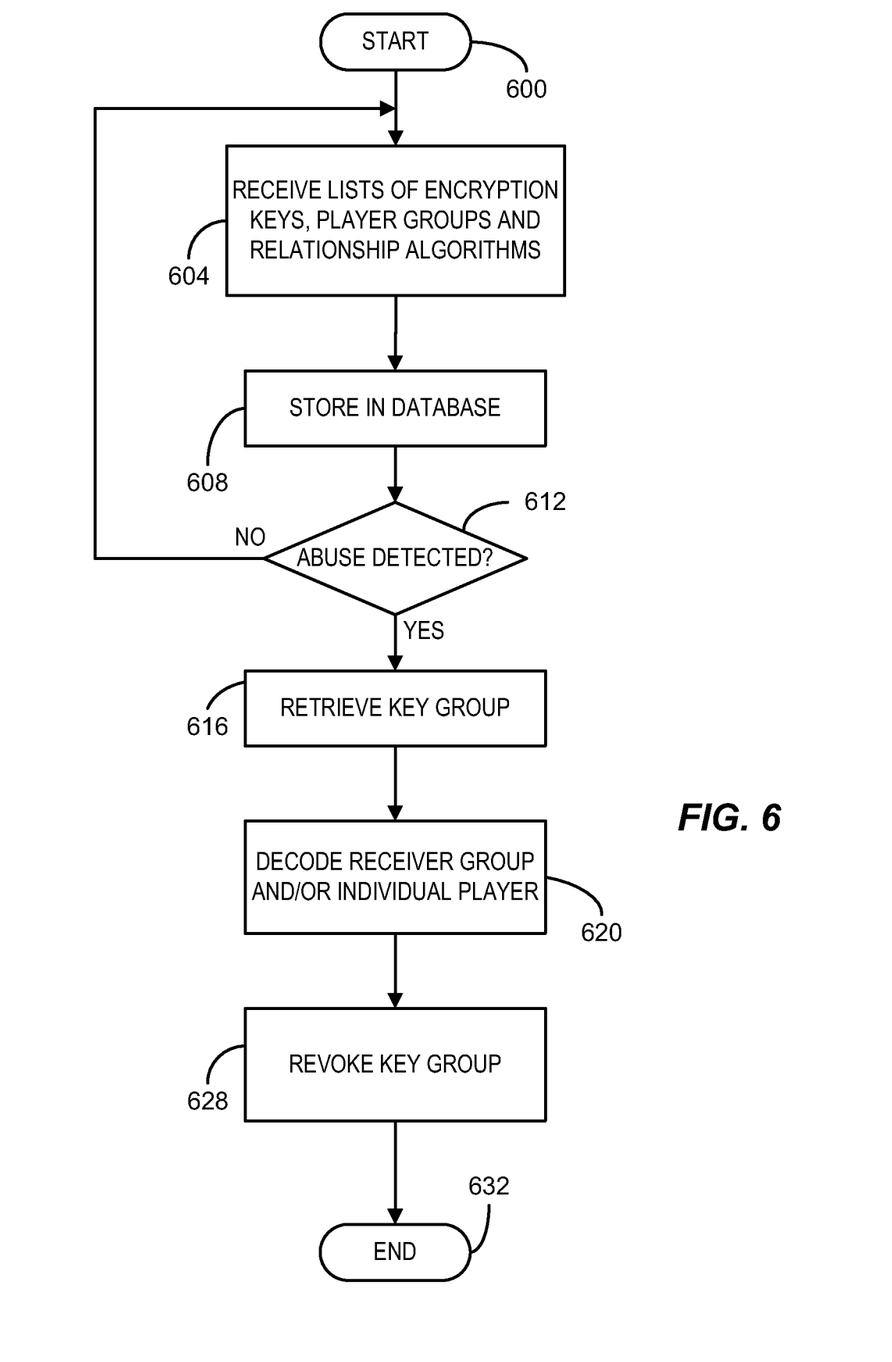
FIG. 6 is a view of an illustrative process for use by a licensing authority consistent with certain embodiments of the present invention.

Turning now to FIG. 6, for certain embodiments of the invention a licensing authority provides for key management and key traceability for the system. The license authority is a separate entity from the licensed Replicator or stream Generator that is used for tracking and enforcement of the encryption key sets as produced by use of the exemplary system. The license authority receives lists of the encryption keys, the player groups to whom the keys are referenced, and the relationship between the encryption keys and player groups 604. In an exemplary embodiment, the license authority would receive from Replicator A the list of Device Keys that are registered to this Replicator. Along with this list would be a list of the boundary segmentation used with the Device Keys, as related above, the lists of what sections of the registered Device Keys are related to what groups, and the tables of Key Variants that are referenced by each value of each segment of the Device Keys. In this fashion, the license authority and the licensed Replicator maintain a duplicate set of tracking information for encrypted content. This information is then saved on a per Title basis in a secure database 608.

The license authority can be given the responsibility to peruse information sources such as the Web and Internet to determine if, and when, a set of clear sub-Title Keys is placed in the public domain. If abuse is not detected 612, the license authority continues to receive lists of encryption information 604 and store such in the secure database 608 as stated above. However, if abuse is detected 612, in the form of a publicly displayed set of sub-Title Keys, the license authority will first retrieve key groups 616 and search the lists of sub-Title Keys to determine if these sub-Title Keys are under their jurisdiction. If this is the case, the license authority then decodes the relationship between the sub-Title Key and the player, using the Device Key and associated Key Variant as interim steps. In this fashion, the player group is matched to the publicly disclosed set of sub-Title Key. The licensed Replicator who issued the set of sub-Title Keys is also discovered at the same time thus completed a complete trace from the publicly disclosed set of sub-Title Keys to the individual Replicator. It is then the responsibility of the license authority to report the compromised content, compromised set of sub-Title Keys, and all tracking information to the owner or license holder of the compromised content 628.

Figure 7:
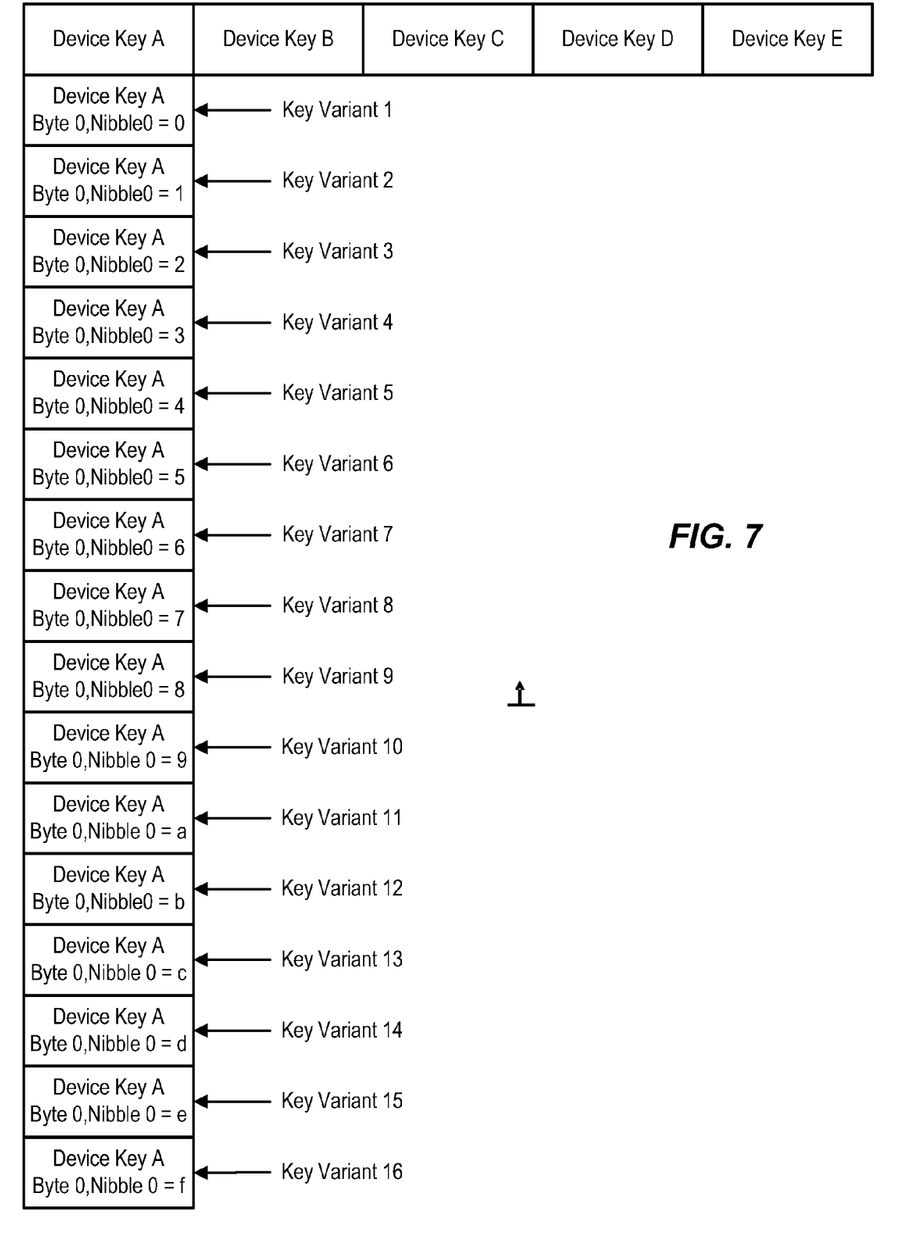
FIG. 7, is a view of an illustrative process for a lookup table for Key Variants that form the basis for traceability consistent with certain embodiments of the present invention.

Turning now to FIG. 7, in one exemplary embodiment the sub-Title Keys generated through AACS Sequence Keys and the SKB may be used as described above. In another exemplary embodiment, an alternative approach to generating sub-Title Keys is discussed which seeks to identify one of the unique Device Keys of a player by systematically encrypting with a sub-Title Key which is a function of the nibble value of the unique device key. Device Keys are assigned by a license authority such as AACS LA to an individual player or a group of players. At least one of the device keys is unique for the player or group of players. That key may be used as the forensic thumbprint for identification. Other shared device keys can be assigned based on values of the at least one unique device key. These shared device keys could be assigned on a nibble-by-nibble or byte-by-byte basis. The device key assigned by a license authority such as AACS LA, in certain embodiments of the invention, to the player is 16 bytes in length, which, when rendered into nibbles, will produce up to 32 nibbles for use as pointers.

Figure 8:
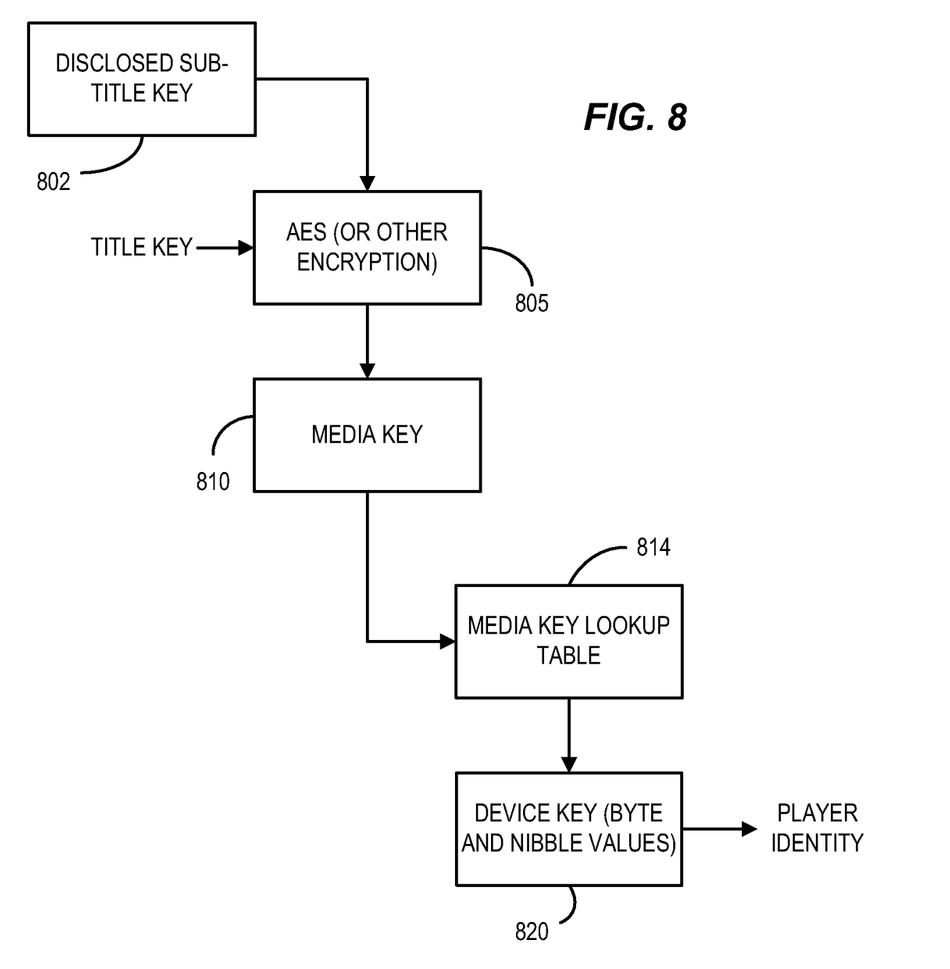
FIG. 8 is an illustrative process for tracing the pathway from a disclosed set of sub-Title Keys to a compromised player from which it originated consistent with certain embodiments of the present invention.

Turning now to FIG. 8, consistent with certain embodiments of the present invention in tracing the path from a publicly disseminated Sub-Title Key 802 back to the player from which the Sub-Title Key 802 originated, the license authority simply retraces the path of origination of a Sub-Title Key 802 to determine the Title Key and Key Variant 810 used to create the disclosed Sub-Title Key 802. All Sub-Title 802, Title, and Key Variants 810 are known to the license authority. With the discovery of the Key Variant 810 from the disclosed Sub-Title Key 802, the license authority may then use the Key Variant 810 to recover the nibble value of the appropriate Device Key 820, which then discloses from which player the Sub-Title Key 802 was taken. The license authority may then use this information in an investigation of security arrangements for the discovered player. Once the discovered player is verified by the license authority, the license authority may then revoke the device keys associated with the compromised player to that that future content may not be decrypted.

In one embodiment consistent with the present invention a method and system for strengthening the security of a Title Key, strengthening the encryption of content encrypted with a Title Key, and traceability for Title Key origination will be presented. A primary difficulty in determining the origin of a Title Key is that a single Title Key may be used by an unknown number of devices for encryption and decryption of content. There is no traceability inherent in a Title Key that is disseminated with thousands or even hundreds of thousands of copies of content encrypted with the same Title Key. So, if a Title Key is compromised and displayed in a public venue such as the Internet or the World Wide Web, all content encrypted with the disseminated Title Key becomes publicly available and destroys the ability of the artists and creators of the content to profit from their labor.

In an embodiment consistent with the present invention a mechanism is provided whereby a Title Key may be made more secure and traceability for the Title Key may be established without disrupting the content stream. This means will employ a method and system that utilizes a combination of Device Keys and Key Variants to fracture a Title Key in such a manner that the Title Key is able to provide a more secure encryption methodology and institute a traceability path such that a license authority can trace a Title Key that has been made publicly available back to a group of players from which it originated.

In certain embodiments, this method and system is also highly efficient, causing minimal additional overhead in the encryption process, and is provided at the transport layer of network communication capability. There is also no need to insert control codes or additional file segments within encrypted content as the system and method provides for encryption using processes currently in place.

Thus, in certain embodiments, a method for identifying the source of content encryption keys involves disseminating a previously determined, related set of device keys into individual content players; determining the available number of encryptions and the number of encryption keys to use in multiple encryption of content; producing a plurality of copies of data content packets which is important to decoding or making sense of the rest of the content, each copy of which is separately encrypted using any one of the previously determined encryptions and any one of the related encryption keys;

delivering encrypted content to a plurality of individual players, each player of which receives content encrypted by an incrementally different set of content encryption keys derived from the set of related device keys; and wherein the delivered encrypted content is written to a receiving device or file, or streamed to an individual player for non-synchronous playback.

In certain embodiments, the set of device keys have been previously created by a license authority. In certain embodiments, the license authority creates and disseminates a plurality of Sequence keys related to the device keys. In certain embodiments, the license authority creates and disseminates a plurality of keys dependent the value of one of device key nibble, device key byte. In certain embodiments, A method as in claim 1, for identifying the source of content encryption keys, wherein the content encryption keys are related by an algorithm that assigns a different encryption key to each nibble of a device key. In certain embodiments, each nibble or byte of a device key serves as a pointer to derive a Key Variant value; and each Key Variant is used to construct a sub-title key. In certain embodiments, the determining is provided by a license authority, and comprises at least three of the related keys. In certain embodiments, encryption of content occurs in the transport layer prior to transmission of any encrypted content. In certain embodiments, the incremental encryption is performed on frames headers of content identified as critical content. In certain embodiments, selected content comprises at least I-frames for MPEG encoded content. In certain embodiments, the method further involves selecting an encryption key from the plurality of previously selected encryption keys; and encrypting a first portion of critical content with the selected encryption key; and testing the encryption key list to determine if the key just used is the last key in the set of selected encryption keys; then if the key is the last key in the set, selecting the first key in the set again or selecting a base encryption key; if the key is not the last key in the set, selecting the next key in the set; then testing to see if all content has been encrypted; if there is more content to be encrypted, return to first step; else assembling a stream of encrypted content from the encrypted portions of content encrypted by the plurality of encryption keys. In certain embodiments, the mathematical algorithm is a binary tree relationship. In certain embodiments, the data describing key relationship and content player identity are sufficient to identify at least a group of players for the selected critical content after transmission to the players.

In another embodiment, a system for identifying a group of content players has a processor for determining a number of encryptions and encryption keys used for tracking use and transmitting these encryption keys into individual content players. The processor also produces a plurality of copies of critical data content packets, each copy of which is separately encrypted using any one of the previously determined encryptions and any one of the related encryption keys, where the related encryption keys are sub-title keys. The data content frames are incrementally encrypted through the use of a plurality of the sub-title keys prior to transmission of encrypted content. The processor transmits the related set of encryption keys and data describing key relationship and content player identity to a previously determined license management agency. The encrypted content is transmitted to a plurality of individual players, each player of which receives content encrypted by an incrementally different set of encryption keys from the set of related encryption keys. The processor writes the transmitted encrypted content to a receiving device or file, or streams the encrypted content to an individual player for non-synchronous playback.

In another embodiment, a computer readable storage medium storing instructions which, when executed on a programmed processor, carry out a process of preventing identifying the source of content encryption keys by disseminating a previously determined, related set of device keys into individual content players; determining the number of encryptions and the number of encryption keys to use in encrypting content; producing a plurality of copies of critical data content packets, each copy of which is separately encrypted using any one of the previously determined encryptions and any one of the related encryption keys; incrementally encrypting data content frames prior to transmission of encrypted content; transmitting related set of encryption keys and data describing key relationship and content player identity to a previously determined license management agency; transmitting encrypted content to a plurality of individual players, each player of which receives content encrypted by an incrementally different set of encryption keys from the set of related encryption keys; and wherein the transmitted encrypted content is written to a receiving device or file, or streamed to an individual player for non-synchronous playback.

In certain embodiments, the set of device keys have been previously created by a license authority. In certain embodiments, the license authority creates and disseminates a plurality of Sequence keys related to the device keys. In certain embodiments, the license authority creates and disseminates a plurality of Key Variants. In certain embodiments, the content encryption keys are related by an algorithm that assigns a different content encryption key to each nibble of a device key. In certain embodiments, each nibble of a device key serves as a pointer to derive a Key Variant value based on shared device keys; and each Key Variant is used to construct a sub-title key. In certain embodiments, the determining is provided by a license authority, and consists of at least three of the related keys. In certain embodiments, encryption of content occurs in the transport layer prior to transmission of any encrypted content. In certain embodiments, the incremental encryption is performed on frames headers of content identified as critical content. In certain embodiments, selected content comprises at least I-frames for MPEG encoded content. In certain embodiments, the process further involves a processor selecting an encryption key from the plurality of previously selected encryption keys; and encrypting a first potion of content with the selected encryption key; and testing the encryption key list to determine if the key just used is the last key in the set of selected encryption keys; then if the key is the last key in the set, selecting the first key in the set again; if the key is not the last key in the set, selecting the next key in the set; then the processor testing to see if all content has been encrypted; if there is more content to be encrypted, return to first step; else assembling a stream of selectively encrypted content from the encrypted portions of content encrypted by the plurality of encryption keys. In certain embodiments, the mathematical algorithm is a binary tree relationship. In certain embodiments, the data describing key relationship and content player identity are sufficient to identify at least a group of players for the selected critical content after transmission to the players.

In certain embodiments, the media can be audio, video, and/or multimedia content, the method involves retrieving a sub-title key from memory, the sub-title key formed from a title key and a Key Variant where the Key Variant is derived from a unique Device Key nibble and nibble value; reading the media storage device to identify one or more content packets that are duplicated multiple encryption packets and which are decryptable by the retrieved sub-title key; decrypting the one or more packets by processing the content packets using an encryption algorithm which uses the sub-title key to unlock the packets; decrypting content packets identified as not multiple encryption packets using an encryption algorithm which uses a title key to unlock the content packet; wherein the decrypted packets are assembled into an output stream clearly viewable on a display device attached to the media player.

In certain embodiments, the media can be audio, video, and/or multimedia content, the method comprising, wherein the sub-title key is a derivative of the title key. In certain embodiments, the forming of a sub-title key uses a Key Variant and a title key encrypted using an encryption algorithm. In certain embodiments, a plurality of Key Variants are stored within a storage device and referenced by a unique value of a specific nibble of a Device key. In certain embodiments, a content packet identified for multiple encryption is duplicated for each sub-title key to be used in the multiple encryption. In certain embodiments, a player may be traced from a distributed set of sub-title keys by decrypting the title key using a Key Variant and discovering the nibble of the unique device key assigned to the player. In certain embodiments, a license authority may revoke media and sub-title keys assigned to the identified player.

In another embodiment, a method for a license authority to authorize the playing of a physical media storage device in a media player, the media comprising audio, video, and/or multimedia content involves retrieving a sub-title key from memory, the sub-title key formed from a title key and a Key Variant where the Key Variant is referenced within the memory by a unique Device Key nibble and nibble value; reading the media storage device to identify one or more content packets that are duplicated multiple encryption packets and which are decryptable by the retrieved sub-title key; decrypting the one or more packets by processing the content packets using an encryption algorithm which uses the sub-title key to unlock the packets; decrypting content packets identified as not multiple encryption packets using an encryption algorithm which uses a title key to unlock the content packet; assembling the decrypted packets into an output stream clearly viewable on a display device attached to the media player; wherein the license authority may revoke authorization for playing of the media content. In certain embodiments, revoking the authorization for the playing of media content comprises revoking the media and sub-title keys assigned to the identified player.

While certain illustrative embodiments have been described, it is evident that many alternatives, modifications, permutations and variations will become apparent to those skilled in the art in light of the foregoing description.

What is claimed is:

1. A system for identifying a group of content players, comprising:
    a programmed hardware processor configured to:
    determine a number of encryptions and related content encryption keys used to track and transmit these related content encryption keys into individual content players;
    produce a plurality of copies of selected critical data content packets, each copy of which is separately encrypted using any one of said previously determined encryptions and any one of said related content encryption keys, where said related content encryption keys are sub-title keys;
    incrementally encrypt data content frames through the use of a plurality of said sub-title keys prior to transmission of encrypted content;
    transmit the related set of content encryption keys as device keys and data describing key relationship and content player identity to a previously determined license management agency,
    identify by the content encryption keys a non-authorized content player which leaked the content encryption keys when the content encryption keys are exposed, and
    creates and disseminates by the license management agency a plurality of Sequence keys related to said device keys;
    transmit the incrementally encrypted content to a plurality of individual players, each player of which receives content encrypted by an incrementally different set of content encryption keys from said set of related content encryption keys,
    where said incremental encryption is performed on frame headers of content identified as critical content; and
    where said processor writes the transmitted encrypted content to a receiving device or file, or streams the encrypted content to an individual player for non-synchronous playback.

2. The system as in claim 1, where said license management agency creates and disseminates a plurality of Sequence keys related to said device keys.

3. A method as in claim 1, where said license management agency creates and disseminates a plurality of Key Variants.

4. The system as in claim 1, where said content encryption keys are related by an algorithm that assigns a different content encryption key to each nibble of a device key.

5. The system as in claim 1, where each nibble of a device key serves as a pointer to derive a Key Variant value based on shared device keys; and each Key Variant is used to construct a sub-title key.

6. The system as in claim 1, where encryption of content occurs in the transport layer prior to transmission of any encrypted content.

7. The system as in claim 1, where said incremental encryption is performed on frame headers of content identified as selected critical data.

8. The system as in claim 1, where selected critical data comprises at least I-frames for MPEG encoded content.

9. A non-transitory computer readable storage medium storing instructions which, when executed on a programmed processor, carry out a process of preventing identifying a source of content encryption keys, comprising:
    disseminating a previously determined, related set of device keys into individual content players;
    determining a number of encryptions and a number of content encryption keys to use in encrypting content;
    producing a plurality of copies of selected critical data content packets, each copy of which is separately encrypted using any one of said previously determined encryptions and any one of related content encryption keys;
    incrementally encrypting data content frames prior to transmission of encrypted content, where said incremental encrypting is performed on frame headers of content identified as critical content;
    transmitting a related set of content encryption keys and data describing key relationship and content player identity to a previously determined license management agency, where the content encryption keys identify a non-authorized content player which leaked the content encryption keys when the content encryption keys are exposed, and where said license authority creates and disseminates a plurality of Sequence keys related to said device keys;

transmitting encrypted content to a plurality of individual players, each player of which receives content encrypted by an incrementally different set of content encryption keys from said set of related content encryption keys; and where said transmitted encrypted content is written to a receiving device or file, or streamed to an individual player for non-synchronous playback.

10. The non-transitory computer readable storage medium storing instructions of claim 9 which, when executed on a programmed processor, carry out a process of identifying a player that leaks encryption keys, where encryption of content occurs in the transport layer prior to transmission of any encrypted content.

11. The non-transitory computer readable storage medium storing instructions of claim 10 which, when executed on a programmed processor, causes the derivation of content encryption keys which if exposed would identify the non-authorized content player which leaked the content encryption keys, wherein said set of device keys have been previously created by a license authority.

12. The non-transitory computer readable storage medium storing instructions of claim 10 which, when executed on a programmed processor, causes the derivation of content encryption keys which if exposed would identify the non-authorized content player which leaked the content encryption keys, where said license management agency creates and disseminates a plurality of Key Variants.

13. The non-transitory computer readable storage medium storing instructions of claim 10 which, causes the derivation of content encryption keys which if exposed would identify the non-authorized content player which leaked the content encryption keys, where said content encryption keys are related by an algorithm that assigns a different content encryption key to each nibble of the device key.

14. The non-transitory computer readable storage medium storing instructions of claim 13 which, when executed on a programmed processor, carry out a process of identifying a player that leaks encryption keys, where said algorithm comprises a binary tree relationship.

15. The non-transitory computer readable storage medium storing instructions of claim 10 which, when executed on a programmed processor, causes the derivation of content encryption keys which if exposed would identify the non-authorized content player which leaked the content encryption keys, where each nibble of a device key serves as a pointer to derive a Key Variant value based on shared device keys; and each Key Variant is used to construct a sub-title key.

16. The non-transitory computer readable storage medium storing instructions of claim 10 which, when executed on a programmed processor, causes the derivation of content encryption keys which if exposed would identify the non-authorized content player which leaked the content encryption keys, where said determining is provided by a license authority, and comprises at least three of said related keys.

17. The non-transitory computer readable storage medium storing instructions of claim 10 which, when executed on a programmed processor, causes the derivation of content encryption keys which if exposed would identify the non-authorized content player which leaked the content encryption keys, where said data describing key relationship and content player identity are sufficient to identify at least a group of players for said selected critical data after transmission to said players.

18. The non-transitory computer readable storage medium storing instructions of claim 9 which, when executed on a programmed processor, carry out a process of identifying a player that leaks encryption keys, where the selected critical data content packet comprises at least I-frames for MPEG encoded content.

19. The non-transitory computer readable storage medium storing instructions of claim 9 which, when executed on a programmed processor, carry out a process of identifying a player that leaks encryption keys, further comprising instructions that:

cause a processor to select an encryption key; and encrypts a first portion of content with said selected encryption key; and testing an encryption key list to determine if a key just used is the last key in a set of selected encryption keys; then if the key just used is the last key in the set of the selected encryption keys, select the first key in the set of the selected encryption keys again;

if the key just used is not the last key in the set of the selected encryption keys, select the next key in the set of the selected encryption keys; then the processor tests to see if all content has been encrypted.

\* \* \* \* \*